২,815,335
Patented Dec. 3, 1957

2,815,335

DIVINYL BENZENE MODIFIED POLYMERS

Lester Marshall Welch, Madison, N. J., assignor to Esso Research and Engineering Company, a corporation of Delaware No Drawing. Application August 29, 1952,
Serial No. 307,170

1 Claim. (Cl. 260—88.1)

This invention relates to copolymers of isobutylene and particularly to copolymers of isobutylene and multiolefins of the type of divinyl aromatic compounds such as divinyl benzene itself and its analogues, whereby the character of the resulting polymer is modified to produce a superior polymer in which the property of cold flow is markedly reduced; these polymers may be either noncurable or possess curing properties.

In the prior art, it has been found possible to prepare a considerable number of extremely valuable copolymers of isobutylene copolymerized with various of the diolefins and multiolefins such as butadiene, isoprene, dimethyl butadiene, myrcene and the like, copolymers being produced to contain multiolefins having from 4 to about 14 carbon atoms per molecule. It has also been found possible to modify the properties of such copolymers by the addition of traces of divinyl benzene in amounts of from one-tenth to five-tenths parts per hundred parts of isobutylene, with from two to thirty or forty parts of the multiolefins being used.

According to the present invention, it is found that a highly valuable copolymer can be produced from isobutylene modified by divinyl aromatic compounds such as divinyl benzene or substituted divinyl benzenes. By this procedure there is obtained a copolymer in which the amount of cold flow is markedly less. It is found that a polymer of this type prepared from a monomer mixture of isobutylene and containing amounts from about one-tenth part of divinyl benzene per hundred parts of isobutylene up to a maximum of about eight parts per hundred parts of isobutylene is particularly valuable for uses in which it is not cured such as in pressure sensitive coatings ("Scotch tape" type of structures) because of the greatly reduced tendency toward cold flow, and the maintenance of a very high adhesiveness. The modified polymers which are capable of being cured are useful in making such articles as inner tubes and the like where the material is required to have a fair amount of mechanical strength prior to curing.

Instead of divinyl benzene, any of the divinyl aromatic substances may be used, including such substances as divinyl toluene, or divinyl xylene or divinyl naphthalene, or the like. Any compound containing one or more aromatic nuclei substituted by at least two divinyl radicals may be used, provided only that any other substituents present are not such as to interfere with the polymerization. That is, substituted divinyl aromatics may be used as well as the simple divinyl benzenes. Similarly, a divinyl benzene containing one methyl substituent, that is, divinyl toluene, is satisfactorily usable, and one or more larger aliphatic radicals may be present without injury to the reactivity of the compound. These include such compounds as divinyl ethyl benzene or divinyl propyl benzene or divinyl butyl benzene and the like. These compounds are all to be regarded as similar to divinyl benzene and are representative only of the invention.

The resulting mixture of unsaturates is cooled to a temperature within the range between about —10° C. and about —100° C., as obtainable by the use of various refrigerants, and by reduced pressures on a refrigerating jacket containing liquid ethylene, or even lower, to temperatures obtainable by mixtures of liquid hydrocarbon refrigerants with liquid methane, down to —164° C., the boiling point of liquid methane. When the desired low temperature has been obtained, the material is agitated vigorously by an appropriate stirrer and a catalyst in the form of a solution of a Friedel-Crafts type catalyst in solution in a low freezing non-complex-forming solvent or in liquid condition is added to the cold unsaturate mixture.

For this purpose aluminum chloride in solution in methyl chloride is the preferred catalyst, but also boron trifluoride in solution in such solvents as liquid propane, liquid ethane, liquid ethylene or even higher boiling solvents is entirely usable. Similarly, aluminum bromide in solution in a hydrocarbon is usable as is also titanium tetrachloride and the other similar Friedel-Crafts catalysts.

Such catalysts as boron fluoride and titanium tetrachloride are normally fluid at room temperature and usually sufficiently fluid at reduced temperatures to be usable as catalyst substances directly, although they are usually used in the dissolved state. Boron fluoride is a gas at room temperature and not very soluble in unsubstituted hydrocarbons but sufficiently soluble to use in solution, especially under pressure. The other substances must be dissolved in appropriate solvents. For this solvent, it is required only that it be low freezing, thereby having a freezing point below the freezing point of water, and that it shall be non-complex forming.

There may also be present in the polymerization reaction mixture a suitable diluent which may take the form of any of the normal halo substituted aliphatic compounds such as ethyl or methyl chloride, ethyl or methyl dichloride, chloroform, ethylene tetrachloride or the like. For this purpose, any of the halo substituted alkyl compounds which are liquid at the polymerization temperature are more or less satisfactory. Alternately also, the petroleum hydrocarbons may be used as diluents. It is generally found that the presence of the diluents is helpful in that it reduces and minimizes the amount of cross linkage formed and reduces the amount of hydrocarbon insoluble polymer produced.

It may be noted that the amount of divinyl compound copolymerized from any given mixture is a function of the relative copolymerizability of the isobutylene and the divinyl compound present. These compounds are less troublesome than such diolefins as butadiene, in that they tend to copolymerize more nearly in the proportion in which they are present in the mixture. However, some show a higher copolymerizability rate and some show a lower copolymerizability rate, and accordingly, there is no absolute connection between the proportion of divinyl compound in the polymer and the amount in the polymerizate feed.

The production of soluble or insoluble polymers containing more or less quantities of gel by the use of modifying agents such as divinyl benzene is considerably influenced by certain other factors. The most important factor other than the amount of cross-linking agent is the average chain length of the polymer produced. This chain length can be affected by changing the ratio of diluent. For instance, if there is 10 parts of diluent per part of isobutylene reactant, the chain length will be substantially shorter than if 2 parts of diluent per part of isobutylene reactant are used. Similarly, the chain length may be shortened by use of poisons such as butene-1, propylene, etc. which do not enter substantially into the polymerization. A third method of shortening chain length is accomplished by polymerizing the olefinic mixture to high conversion. The reduction in chain length by the use of each of these methods or any combination thereof will tend to reduce the gel formation resulting from the combined effect of the chain length and the cross-linking agent. In the laboratory, particularly with batch polymerizations, it is preferable to use the "poison" method of control because large quantities of diluent reduce the quantity of polymer produced per run. However, in continuous operation, molecular weight control is best obtained by the use of diluent and by control of the conversion. In either case, the method of molecular weight control is not important to the final results in determining the effect of the amount of cross-linking agent.

In measuring the cold flow properties of a plastic polymer, a portion of the raw polymer free from any compounding agents, sufficient in amount to make a cylindrical pellet ¾" in diameter and ½" in height is placed in a cylindrical mould and held for 40 minutes at a temperature of 287° F. under sufficient pressure to produce a homogeneous, well-shaped pellet. The pellet is then removed from the mould, measured for heights, and placed on a flat plate in an air oven held at 40° C. A weight of 1.8 kilograms is then placed on the pellet and allowed to remain for three minutes. At the end of the three minutes, the weight is removed and the pellet is placed in boiling water for 15 minutes to allow complete recovery of the elastic component of the deformation. The pellet is then accurately measured for its final height. The "cold flow" or "permanent deformation" is then calculated from the following equation:

Cold flow (percent/sec.) =
$$\frac{\text{original height minus final height}}{\text{original height} \times \text{time (secs.)}} \times 100$$

It will be noted that this procedure measures the change in height due to flow at 40° C. and avoids any question of elastic deformation which may not be rapidly recovered. It is found that this measurement method is an excellent means for determining the resistance of the polymer to plastic flow and to change of shape during standing at room temperature in plant processing.

The resulting polymer usually is a white plastic solid, depending to some extent upon the presence of impurities, to some extent upon the temperature of polymerization, and to some extent upon the temperature of polymerization as well as upon the particular catalyst used. The polymer obtained may show an iodine number ranging from about 0.4 up to amounts as high as about 10. Polymer having the molecular weight of above about 20,000 is still somewhat plastic but with only small amounts of cold flow. Thus, if the molecular weight is above about 20,000 and the iodine number above from 0.4 to 10, the polymer shows the valuable property of undergoing a curing reaction with such substances as sulfur or with paraquinone dioxime and its homologues or with the various dinitroso compounds to yield a cured polymer substance having a definite tensile strength and a definite elongation at break, which is an excellent substitute for or replacement for rubbery materials. When so cured, tensile strengths ranging from 500 lbs. per square inch up to 3500 or 4000 lbs. per square inch are obtainable, with elongations at break ranging from 250% up to 1200%, depending upon the degree of cure and the type and amount of fillers and other additives present. This polymer, capable of curing, shows the very valuable property of almost complete absence of cold flow before curing thereby greatly simplifying the preparation of inner tubes and other rubber-substitute structures.

Also, by the use of temperatures within the range between about —10° C. and about —40° C., with less potent catalyst and less pure reactants, copolymers ranging from molecular weights in the order of 1000 up to 20,000 are obtainable. Copolymers within this molecular weight range do not cure to a solid substance having a definite tensile strength and definite elongation at break. They are, however, extremely valuable for many purposes such as for the production of uncured cements. These copolymers with a molecular weight ranging from 5,000 to about 20,000, either as such or in combination with a wide range of other substances such as rubber, thermoplastic resins and plasticizers, may be used for highly valuable pressure sensitive materials which show a minimum of cold flow and a maximum tackiness and a maximum firmness of holding of the pressure sensitive coated sheet to the desired object.

The invention is illustrated by the following typical examples, but it is not intended to limit the invention thereto.

EXAMPLE 1

Two mixtures of isobutylene with divinyl benzene were prepared as shown in Table 1 together with appropriate amounts of diluent. The first of these mixtures contained 350 parts of isobutylene, 10 parts of divinyl benzene, and 1050 parts of methyl chloride whereas the second mixture was the same except for the use of 20 parts of divinyl benzene. These mixtures were cooled to a temperature of approximately —98° C., by the use of a jacket of liquid etylene on the reactor, and were then polymerized by the addition of an appropriate catalyst consisting of a solution of approximately 0.26 gram of aluminum chloride per 100 cc. of methyl chloride. The unsaturate mixture was vigorously stirred and the catalyst solution added in a small high pressure jet into the body of the stirred mixture. The polymerization reaction proceeded rapidly and it was found that each gram of aluminum chloride in the catalyst produced approximately 220 grams of solid polymer. As shown in the table below, the respective polymers showed molecular weights of 34,200 and 42,000 and iodine numbers respectively of 2.0 and 3.5.

These polymers were removed from the polymerization mixture, brought up to room temperature, washed on the double roll mill with water to remove residual volatiles and catalysts, and then were compounded according to the following recipe and cured.

| | Parts |
|---|---|
| Copolymer | 100 |
| Stearic acid | 5 |
| Zinc oxide | 5 |
| Carbon black | 10 |
| Sulfur | 3 |
| Tetramethylthiuram disulfide | 1 |

The resulting compounds were then cured for 8, 16 and 32 minutes in each instance and tensile strength, elongation and modulus values were determined. These are shown in Table 1.

This table shows the production of an excellent copolymer suitable as a very valuable replacement for natural rubber which is particularly suitable for tires, tubes, and for such goods as rubber gloves and other "dipped goods."

*Table 1.—Divinyl benzene (DVB) and isobutylene co-polymerization* [a]

| Run No. | Feed | | | | Temperature of polymerization, °C. | Catalyst [b] | | Percent conv.[c] | Staudinger mol. wt. | Iodine number | Time of cure, min. | Tube stock cures at 320° C. | | | |
|---|---|---|---|---|---|---|---|---|---|---|---|---|---|---|---|
| | MeCl, cc. | Isobutylene, cc. | DVB, cc. | Wt. percent | | Conc., g./100 cc. | Eff., g. pol./g. cat. | | | | | Tensile | Elongation | Modulus | |
| | | | | | | | | | | | | | | 300% | 400% |
| 1 | 1,050 | 350 | 10 | 3 | −100 | 0.26 | 220 | 63 | 34,200 | 2.0 | 8 | 370 | 740 | 50 | 120 |
| | | | | | | | | | | | 16 | 490 | 720 | 40 | 130 |
| | | | | | | | | | | | 32 | 730 | 610 | 210 | 400 |
| 2 | 1,050 | 350 | 20 | 6 | −100 | 0.26 | 350 | 101 | 42,200 | 3.5 | 8 | 300 | 800 | 100 | 150 |
| | | | | | | | | | | | 16 | 500 | 700 | 160 | 260 |
| | | | | | | | | | | | 32 | 790 | 680 | 310 | 470 |
| 3 | 1,450 | 350 | 10 | 3 | −40 | 0.26 | 450 | 75 | 15,000 | 2.5 | 8 | Poor cure | | | |
| | | | | | | | | | | | 16 | | | | |
| | | | | | | | | | | | 32 | | | | |

[a] Polymerizations were conducted in a 2.5 liter refrigerant jacketed batch reactor.
[b] Aluminum chloride dissolves methyl chloride.
[c] Based on isobutylene.

A series of polymerizations was made in which the divinyl benzene concentration in the feed ranged from 0.1 weight percent to 0.8 weight percent, based on isobutylene. A temperature of −100° C. was maintained in the reactor by using liquid ethylene as the internal refrigerant to the extent of 3 volumes of ethylene to one volume of isobutylene. To this mixture there was then added 10% of butene-1 based on the isobutylene present in the feed to modify the polymer by reducing molecular weight and increasing its solubility. The polymerization was carried out by adding a catalyst solution consisting of 0.38 gram of aluminum chloride per 100 cc. of methyl chloride. The following data were obtained:

| Percent DVB in feed based on isobutylene | Percent conv. of isobutylene | Mooney at 212° F. | Percent gel in polymer | Percent flow at 60° C., 1.8 kg./sq. cm. for 4 weeks |
|---|---|---|---|---|
| 0.0 | 80 | 65 | 0.0 | 37 |
| 0.1 | 70 | 69 | 8.3 | 5 |
| 0.2 | 40 | 64 | 21.4 | 0 |
| 0.4 | 64 | 79 | 54.0 | 0 |
| 0.6 | 71 | 58 | 41.2 | 0 |
| 0.8 | 90 | 55 | 42.9 | 5 |

It is apparent from the above table that as little as 0.1% divinyl benzene in the feed greatly reduces the normal tendency of the unmodified polyisobutylene polymer to flow as shown by the cold flow of the control polymer. This material is thus highly satisfactory for use as a pressure sensitive material.

EXAMPLE 3

A series of polymerizations was made in a batch reactor in which the divinyl benzene concentration in the feed ranged from 0 to 0.8 weight percent based on the isobutylene (calculated as 100% divinyl benzene). A temperature of −100° C. was maintained in the reactor by using liquid ethylene as the external refrigerant. The feed was diluted with 10 volumes of methyl chloride to one volume of isobutylene. No butenes were added—control of the polymerization, reduction of the molecular weight and solubility of the polymer being effected in this case by the large volume of diluent. To this mixture was then added, carefully by jet addition, a catalyst solution containing 0.16 gram of dissolved aluminum chloride per 100 cc. of methyl chloride. The data in Table II below were obtained.

The marked reduction in cold flow obtained with very small increments of divinyl benzene in the feed is again apparent. In these examples, the lack of gel formation is an added advantage for use in solvent-applied end uses such as pressure-sensitive tapes.

*Table II.—Divinyl benzene modified polyisobutylene, no added butenes*

| Run No. | Percent DVB in feed | Percent conversion of isobutylene | Mooney at 212° F., 8' | Percent gel | Percent flow at 80° C., 1.8 kg. for 30 minutes |
|---|---|---|---|---|---|
| Polyisobutylene | 0 | — | 66 | 0 | 21.6 |
| 4 | 0.2 | 64 | 91 | 0 | 2.9 |
| 5 | 0.4 | 63 | 100 | 0 | 2.1 |
| 6 | 0.8 | 65 | 96 | 0 | 0.5 |

This application is a continuation in part of application Serial No. 57,407, filed October 29, 1948, now Patent 2,609,363.

What is claimed is:

A polymerization process comprising the steps of mixing together reactants consisting of a major proportion of isobutylene and from 0.1 up to about 8% of divinyl benzene, diluting the mixture with 10 volumes of inert diluent per volume of isobutylene, cooling the mixture to a temperature of about −100° C., and polymerizing the mixture in the absence of added n-butenes, by the addition thereto of a Friedel-Crafts active metal halide catalyst in solution in a low freezing, non-complex-forming solvent.

References Cited in the file of this patent

UNITED STATES PATENTS 2,213,423   Wiezevich _____ Sept. 3, 1940
2,609,363   Welch _____ Sept. 2, 1952